Sept. 12, 1939.  J. A. H. BARKEIJ  2,173,081
INTERNAL COMBUSTION ENGINE
Original Filed Sept. 5, 1933   5 Sheets-Sheet 2
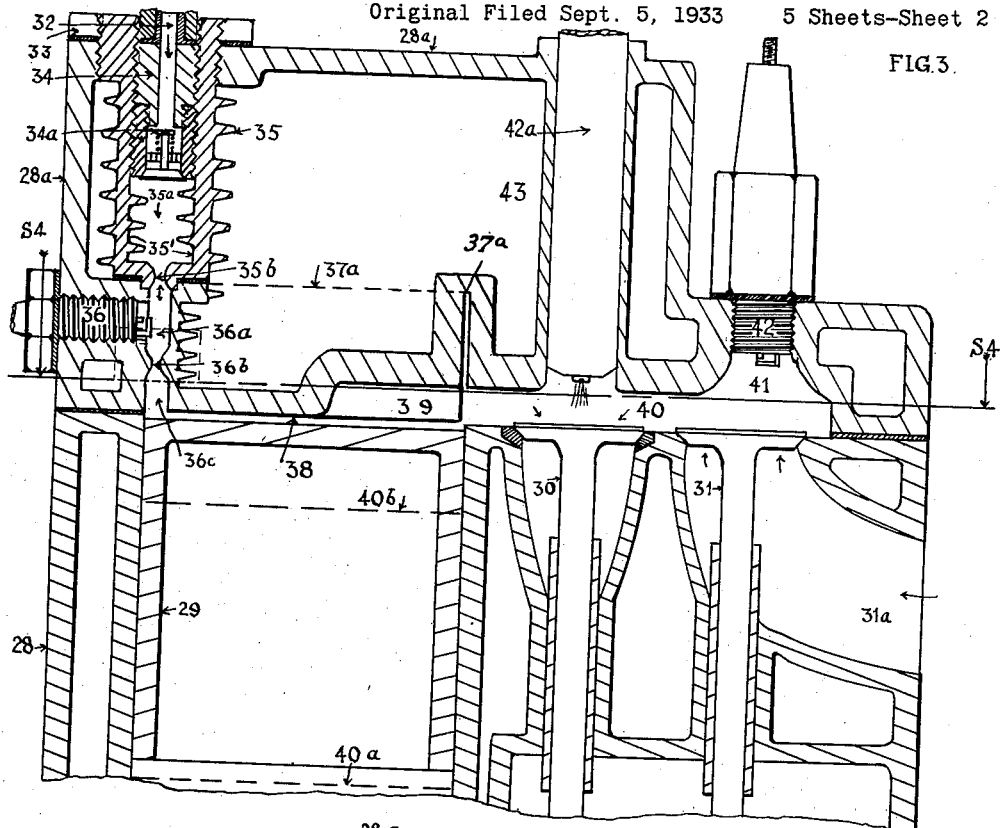
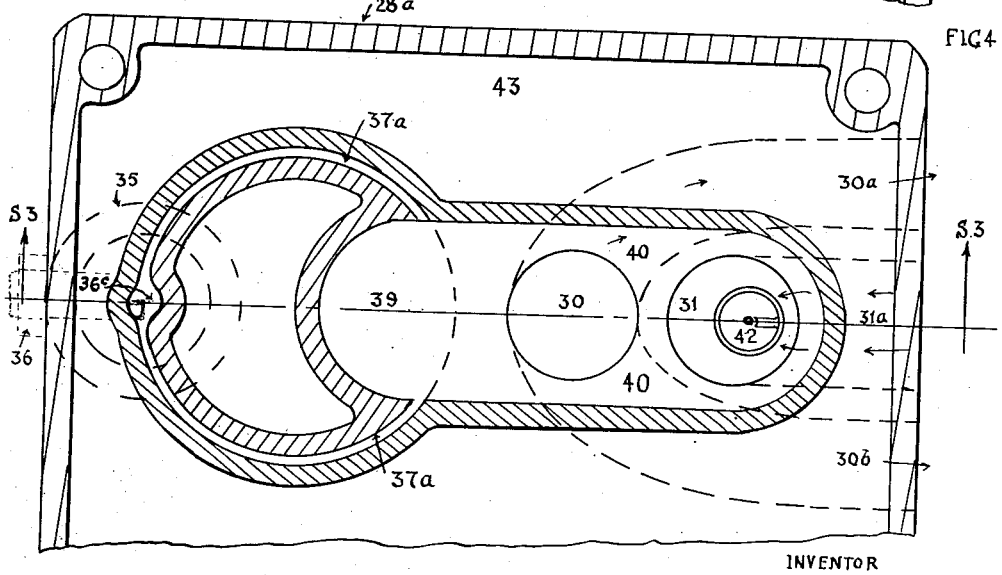
INVENTOR
J.A.H.Barkeij

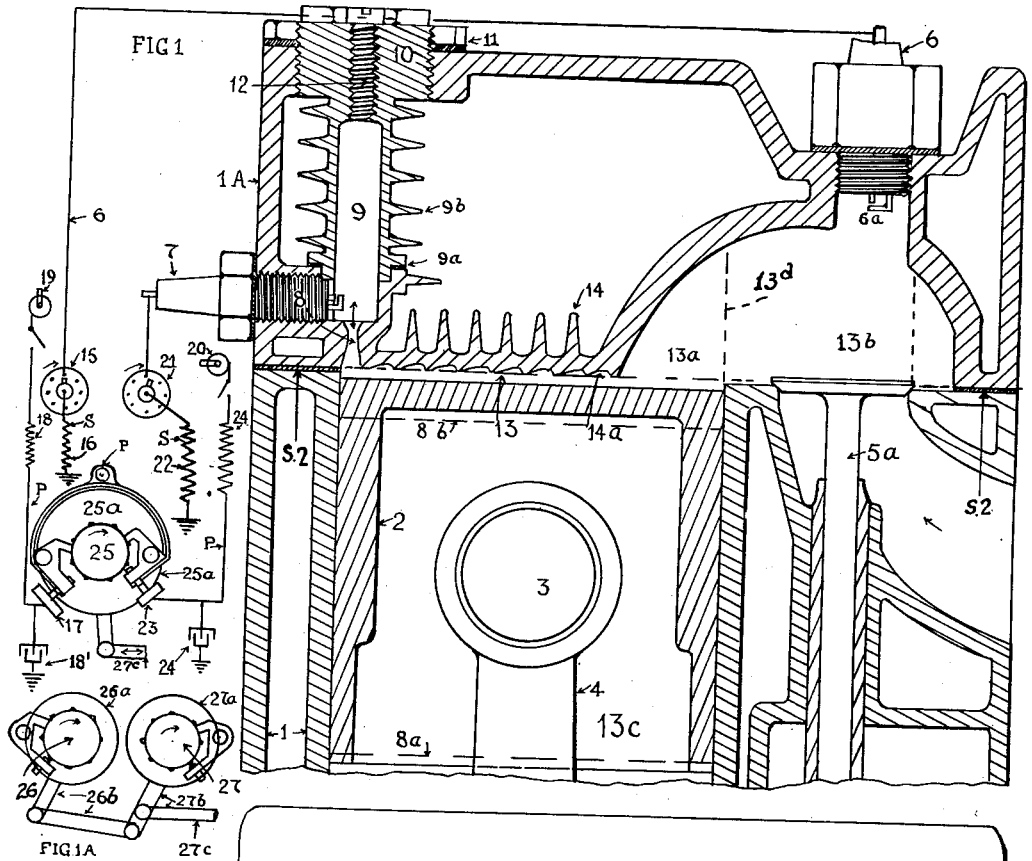

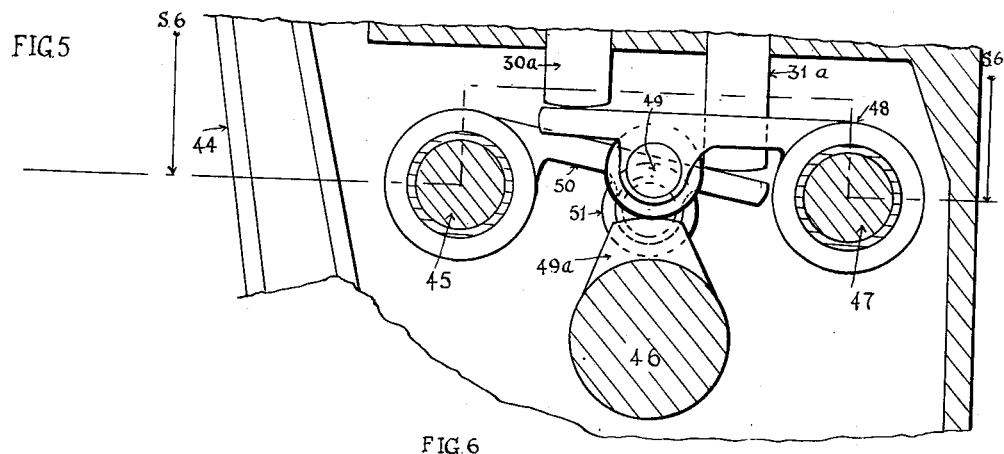
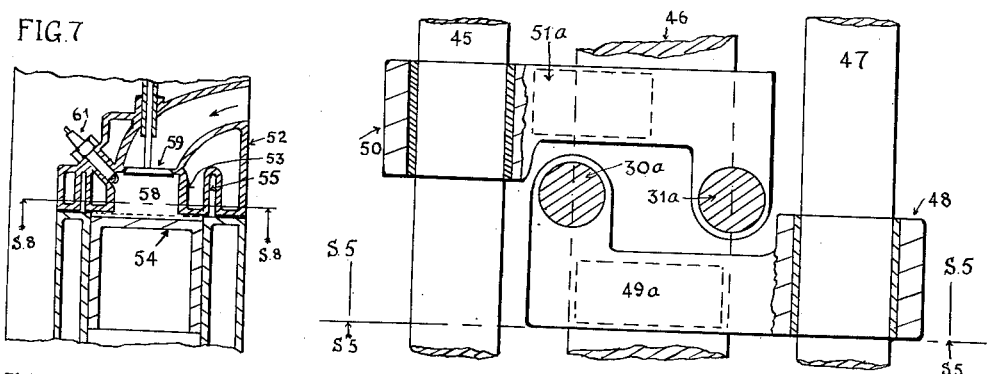
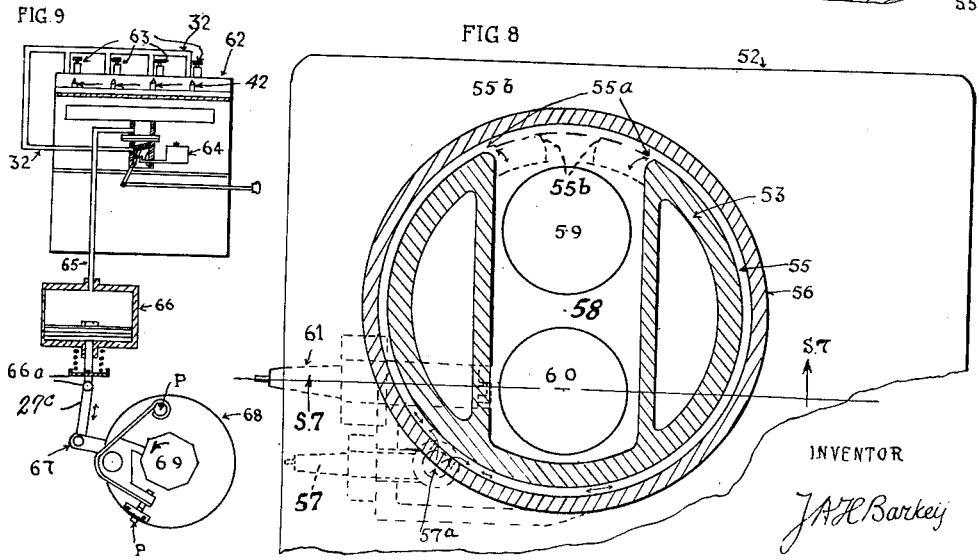

Sept. 12, 1939.  J. A. H. BARKEIJ  2,173,081
INTERNAL COMBUSTION ENGINE
Original Filed Sept. 5, 1933   5 Sheets-Sheet 4
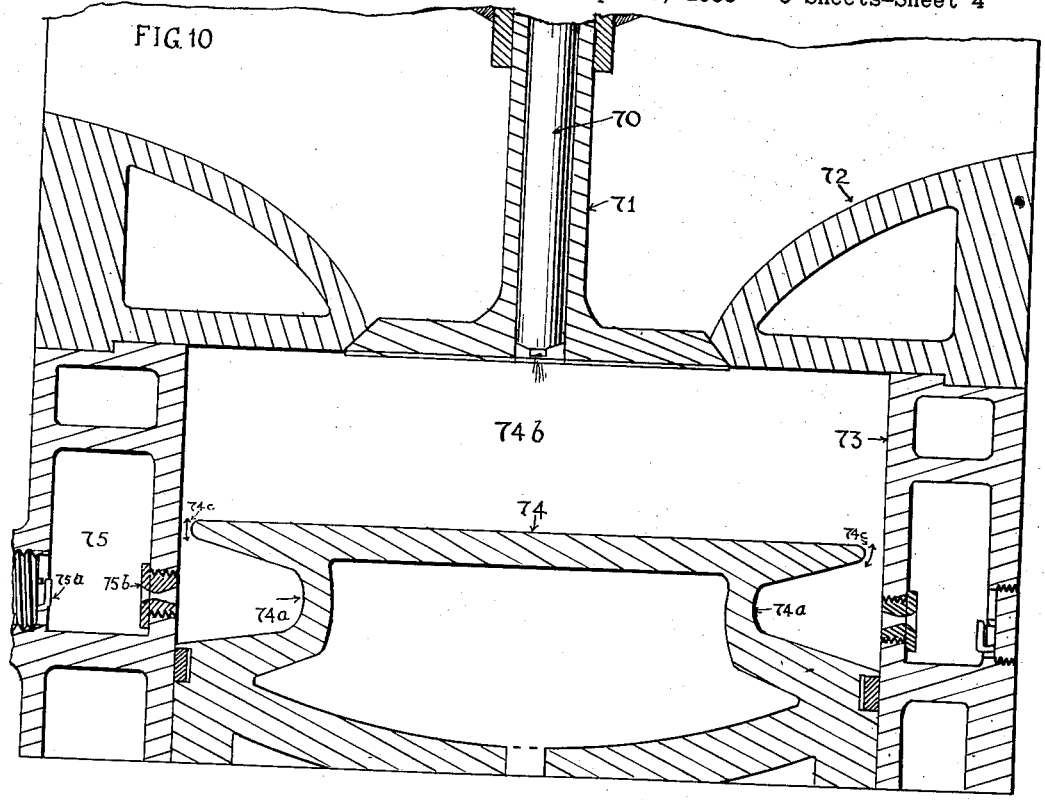
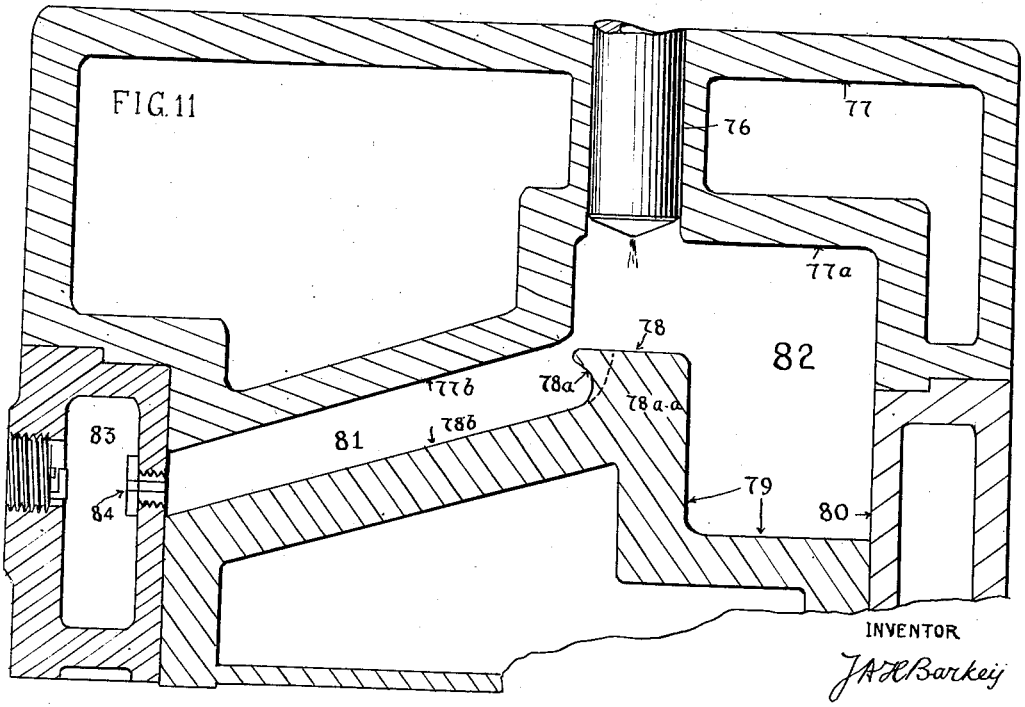
INVENTOR
J.A.H.Barkeij

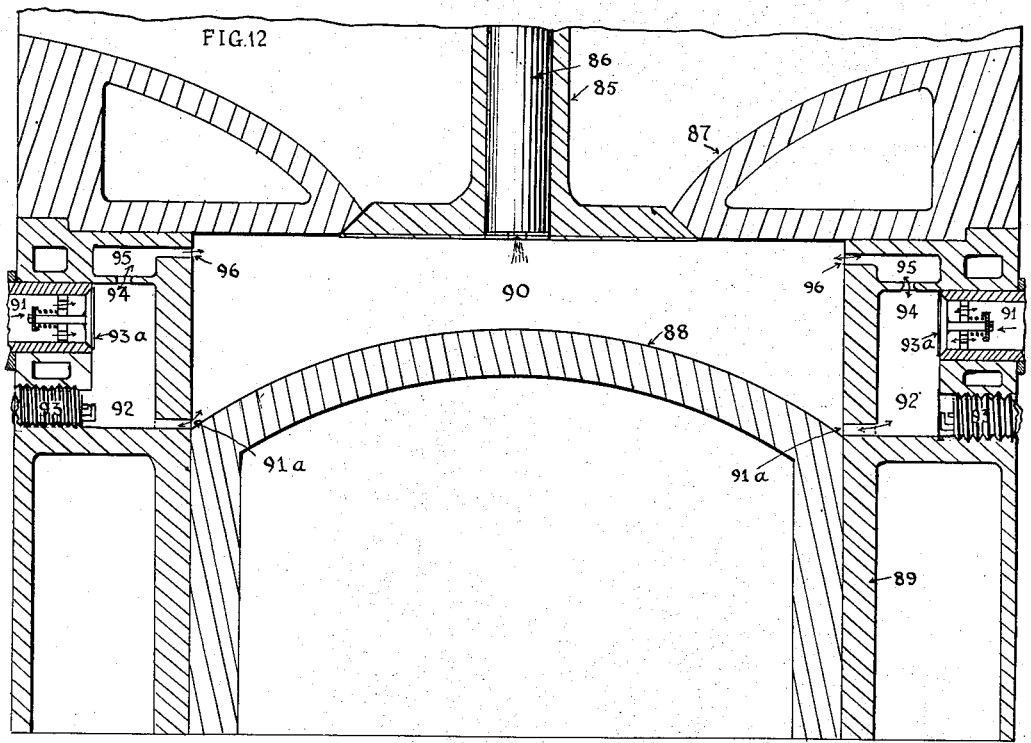
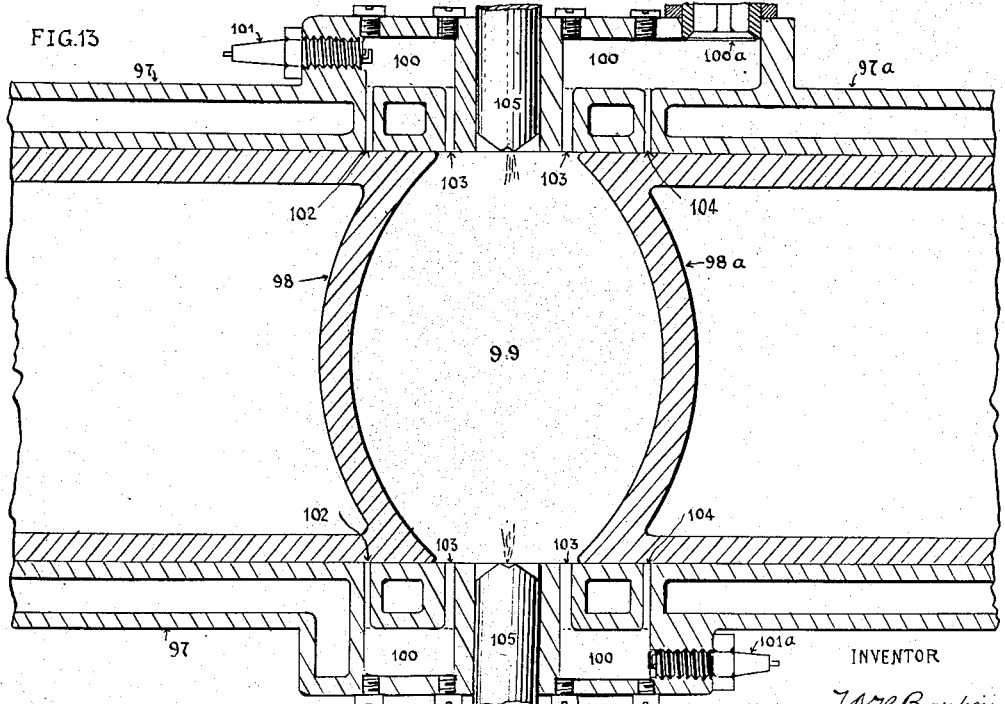

Patented Sept. 12, 1939

2,173,081

UNITED STATES PATENT OFFICE 2,173,081

INTERNAL COMBUSTION ENGINE

Jean A. H. Barkeij, Altadena, Calif.

Application September 5, 1933, Serial No. 688,167
Renewed May 11, 1938

5 Claims. (Cl. 123—191)

My invention relates to internal combustion engines and more particularly to the construction of the combustion chamber and to the means for controlling the combustion of the combustible charge introduced therein.

It will be recalled that heretofore many attempts have been made to vary the volume of the combustion chamber for controlling power output and for providing a more efficient engine performance under different load conditions. Heretofore these attempts have relied upon mechanical means for varying the volume of the combustion chamber and such constructions have not been entirely satisfactory. There have been other means proposed for accomplishing this result, which means comprises in general an arrangement whereby a stratification of the fuel mixture charge is had.

An object of my present invention is to provide an internal combustion engine having an improved performance incorporating therein an organization embodying a readily controlled means for boosting the compression and temperature within the combustion chamber prior to the ignition of the main charge of combustible fluid contained therein.

Another object is to decrease in general detonation in my combustion chambers by providing cooling ribs, or fins, or grooves, not only on the outside walls of the combustion chamber, but also on the inner walls thereof, especially in that part of the combustion chamber which is approached by the piston so that a low clearance zone is formed therebetween. The object of this construction is that the gases under compression can get rid of their heat when coming in touch with a greater surface. If these cooling ribs are constructed over the entire surface of the combustion chamber, which is cooled on the outside by a cooling medium, preferably a liquid, we would loose, however, during the combustion a great deal of the heat of said combustion, but if constructed preferably only over that part of said cooled combustion chamber wall in which the last part of the gases burn, it is possible to effect a greater thermal efficiency in an internal combustion engine, especially in the explosive type. Therefore I provide substantially only the low clearance zone, as shown in Fig. 1, with inside cooling ribs or fins. It stands to reason that I may further intensify the cooling effects of the internal ribs or fins or grooves, by providing the outer surface of the walls of said combustion chambers with cooling ribs, fins, or grooves extending into the cooling medium, air or liquid, so that I intensify the transfer of heat from the inside to the outside still faster. These outside cooling ribs should also, preferably extend only over that part which lies over the low clearance zone. My object is therefore also to increase the possibility of a higher compression ratio without increasing the tendency to detonation or selfignition, or not increasing it in the same ratio. It is understood in this object that I cool the outside of the wall of the combustion chamber preferentially with a liquid, but that this object is not necessarily confined thereto. It stands to reason that such a combustion chamber or cylinderhead may be made of any kind of metal, preferably, of course, of a metal having a high conductivity coefficient.

More particularly it is an object of my present invention to provide an internal combustion engine structure with main and auxiliary combustion chambers, each of which are provided with ignition means which are so timed with the engine operation as to ignite the charge in the auxiliary chamber prior to the ignition in the charge in the main combustion chamber, thereby utilizing the increased pressure produced in said auxiliary chamber for relatively increasing the pressure of the charge in the main combustion chamber whereby to obtain a more efficient combustion.

This principle is of more particular value in the so-called high compression-ignition type. In this type the air-charge is compressed at least to a pressure of about 12 to 14 atmosphere in order to create a temperature at the end of the compression stroke sufficient to ignite the fuel injected therein. If the ratio of compression is materially reduced, let us say to 10, 8 or even 6 atmosphere, it would be absolutely impossible to start the engine on the high compression cycle, especially not if below zero temperatures prevail, in which even engines with 12 or 14 atmosphere compression are hard to start. In the present construction I raise these lower compression temperatures by means of a relatively small volume of explosive gases introduced by a separate valve in an auxiliary chamber connected to the main chamber, having the aircharge, by means of a more or less restricted passage. This small volume of explosive gases is ignited by a sparkplug at any time after the valves of the engine are closed shortly after the compression stroke starts and before the piston reaches its top position and before the fuel is injected under pressure in the main charge in the main combustion chamber. I may, however vary the timing of the spark ignition widely so that during starting it may be timed very late and during normal running very early or reversely. The burning of this volatile mixture raises the final temperature of the air mass sufficiently to be able to ignite the injected fuel (usually heavier fuel) during starting and using a mechanical compression ratio insufficient to ignite the said heavier fuel. The advantages obtained thereby are manifold. For instance the volume of the compression space does not have to be so small as in standard high-compression engines. In case a valve-in-head engine is used, as usually in this type of engine, it is difficult to arrange the inlet and exhaust valves and their timing so that the piston is not liable to hit the valves if they stick or do not close in time. In the present type this chamber may be constructed considerably larger because of the increase in pressure and volume of the aircharge by the burnt gases of said exploded explosive charge, and the mechanical limitations spoken of are considerably decreased. Further the fuel does not have to be injected with such a force and pressure, because this method of operation allows us to increase the final temperature without increasing the final pressure. It stands to reason that according to the gas formula $$\frac{PV}{T} = \frac{P^1V^1}{T^1}$$

it is mechanically considerably easier to inject a (heavier) fuel into an air mass with lower pressure but higher temperature than into an air mass with higher pressure and lower temperatures. Roughly this gas formula represents the true relation of these factors in the present method of operating an internal combustion engine.

Others like Saives and Werner have proposed a similar method, but they injected (heavier) fuel into the explosive charge in the auxiliary chamber, but substantially simultaneously with the fuel injection in the main combustion chamber.

Further the lower maximum pressures will allow construction engineers to build lighter engines, lighter than the standard Diesel type.

The methods of operation differ from the types of Werner and Saives especially in this respect that subsequent and successive combustions in two separate chambers take place. This subsequent ignition may take place or may be effected, either by spark ignition means, or fuel injection means, or in combination with each other in both chambers, and even by mere compression as far as the additional charge in the additional chamber is concerned if this is an explosive charge of course (I mean self-ignition by great compression) while there are other ignition means (spark plug or fuel-injector) in the main chamber.

In the pure explosive type of engine, two spark plugs are used, one in each chamber and the mixture is exploded in the additional chamber about 5° to 15° or more ahead of the explosion in the main chamber.

In the compression-ignition type, either a spark plug is used in the additional chamber or none at all employing self-ignition by compression. In the latter type, using 12 to 14 atmosphere and more final pressure, it stands to reason that this mixture will explode by self-ignition when the piston is about half-way up or at least 60° from top dead center. If a fuel injector is used in the additional chamber, likewise the primary injection there may have to take place as early as 90° to 60° before top dead center position, but at least 45°. And at least 30° ahead of the secondary injection.

In the intermediate type, the Hesselman engine using an injector and spark plug in the main chamber and using a much lower compression ratio, the combustion or rather injection in the auxiliary chamber may take place also very early in the compression stroke 60° to 90° before top dead center. It is well known in the art that the ignition lag of the injected fuel is great compared with the lag of pressure formation after spark ignition in an explosive engine, and in fact so great that the pressure and temperature has to be built up by small fuel injections way ahead of the main injection, which starts of course, normally like in standard compression ignition engines, also considerably (about 20° to 10° before top dead center position). However in the explosive type if very weak mixtures are used, the primary ignition may have to take place likewise 30° ahead of the secondary ignition.

In all figures I have shown an auxiliary valve for the auxiliary chamber to introduce the explosive mixture therein, but if no explosive mixture is used, this valve is superfluous, as shown in Figs. 10 and 11 for the two stroke engine with a single piston and the two-stroke engine with two pistons in Fig. 13. However, it is understood that if in these types, the two-stroke cycle, type, an explosive mixture is used in the auxiliary chamber, it has to be pumped via an auxiliary valve and inlet manifold in said chambers, the main chambers receiving an aircharge through the main valve and main inlet manifold thereof.

In Fig. 13, however, I have shown two fuel injectors in the main chamber, so that even there these two injections, may take place successively in the main chamber, with a considerable interval of 30° as stated, and about 70° to 60° and at least 45° before top dead center position. This latter difference is the main difference between my methods of operations and those of Werner and Saives.

It is further understood that the same interval between the spark-ignition in the explosive type may take place, in case very weak mixtures are used. The burning of said mixtures increase in slowness considerably the weaker they are made and in order to obtain the maximum pressures when the piston reaches top dead center position, the primary ignition must take place considerably ahead of the secondary. Further in the spark-ignition type, as shown in Figs. 1 and 2, the timing of the proper ignition is a very delicate job. One spark plug may ignite only 15° to 5° ahead of the spark ignition of the main gas mass in the main chamber. To effect a great accuracy, I use a single distributor for the making and breaking of the primary current, but I use two separate distributors to divide the sparks of the secondary currents over two sets of sparkplugs. In the Figure 1 I use, a cam with eight humps and two breaker arms, one for each set of eight sparkplugs.

The two primary circuits are associated with two secondary circuits and two coils as shown. For the advance and retardation of this ignition I employ a suction-operated device, as is well known in the art by itself. It is a piston or diaphragm moved in one direction by the partial vacuum in the intake manifold and in the opposite direction by a spring. By applying a single such apparatus and a single primary-circuit distributor I advance and retard the ignition accurately in the same proportion for the two sets of eight sparkplugs. Because if I used two separate primary-current, or circuit, distributors and two separate vacuum-operated devices, one for each distributor, the interval would probably loose its accuracy, because the backlash in two drives, even if driven from the same shaft, might differ and what is more important, the action, friction and suction in the two separate vacuum devices may differ, especially after some usage and the relative timing between said two sets of sparkplugs may differ appreciably from the original setting, if this could be done accurately and economically from the start. In the present construction the two breaker arms can be accurately placed on the same distributor so that this point is the only point that may be altered by usage or wear and tear. The cams which operate upon said breakers are the same and wear out in the same ratio for both breakers.

In case I use also a double distributor for the primary circuits, however, I do employ a single suction-operated device to retard or advance the ignition (the making and breaking of the primary circuit) of both distributors simultaneously by connecting the arms of both distributors to the same arm connected with said device. To differentiate still further in the timing of these two sets of plugs, I employ arms of different length thereon, describing different arcs, so that the retardation of one set of sparkplugs may differ from that of the other set with different engine speeds for purposes to be explained hereinafter.

To retain a parallel between the explosion and compression ignition engine, the primary ignition is supposed to occur at least 30° ahead of the secondary ignition of the main charge, in both types.

A further object is to place the sparkplug in an auxiliary chamber having a restricted passage between said chamber and the main combustion chamber.

A further object is to construct in an L-head engine a combustion chamber in which there is a restricted passage between the combustion chamber and the piston chamber. This passage is formed by two convex walls approaching each other substantially between that part of the combustion chamber in which the valves are located and the passage lying over the cylinder-bore. This restriction has the tendency to retard somewhat the flame propagation from the valve chamber into the piston chamber, effecting thereby more or less a gradual expansion. At the same time I place the single sparkplug substantially over the exhaust valve as shown in Fig. 2.

Further objects of my present invention reside more particularly in the structural details and arrangement of said combustion chambers for attaining the desired results.

For a further detailed understanding of my invention, reference may be had to the accompanying drawings illustrating preferred embodiments of my invention, and in which:

Fig. 1 is a fragmentary transverse sectional view of an internal combustion engine constructed in accordance with the principles of my invention, and illustrating a typical engine cylinder and cooperating head structure as taken substantially on the line S1—S1 of Fig. 2.

Fig. 2 is a bottom plan view of the cylinder head which illustrates the novel combustion chamber construction, said view being taken substantially on the line S2—S2 of Fig. 1.

Fig. 3 is a vertical transverse sectional view through an internal combustion engine illustrating a modified form of construction and illustrating a different combustion chamber arrangement, said view being taken substantially on the line S3—S3 of Fig. 4.

Fig. 4 is a horizontal sectional view through the cylinder head structure as shown in Fig. 3 and taken on the line S4—S4 of Fig. 3 to illustrate more specifically the combustion chamber construction.

Fig. 5 is a fragmentary sectional detail view of the valve actuating mechanism for actuating the intake and exhaust valves of the engine illustrated in Fig. 3.

Fig. 6 is an additional fragmentary detail view of this valve actuating mechanism and illustrating the actuating means in plan view as taken substantially on the line S6—S6 of Fig. 5.

Fig. 7 is a fragmentary vertical sectional view of an engine embodying a combustion chamber construction of modified form, this construction being particularly adapted for embodiment in an engine of the overhead valve type.

Fig. 8 is a horizontal detail sectional view more particularly illustrating the arrangement of the main and auxiliary combustion chambers as embodied in the engine shown in Fig. 7.

Fig. 9 is a side elevational view of an in line multi-cylinder engine illustrating fuel mixture conducting means connecting the carbureting device with the inlet ports of the auxiliary combustion chamber, and further illustrating in a diagrammatic manner an automatic control device for controlling the actuation of the ignition device of said engine in response to variations in manifold pressure.

Fig. 10 is a fragmentary transverse sectional view of a typical engine cylinder and cooperating cylinder head illustrating a further modified form of construction.

Fig. 11 is a vertical sectional view of an engine illustrating a still further modified form of construction.

Fig. 12 is a vertical sectional view of an engine cylinder and associated head illustrating a further modified form of construction and particularly illustrating a construction in which a fuel injecting device is carried by the single valve associated with the main combustion chamber, and Fig. 13 is a fragmentary sectional view of an engine construction embodying opposed pistons having a common combustion chamber and separate auxiliary combustion chambers, the latter chambers being arranged for positioning in the cylinder block and extending around the cylinder.

Fig. 1A illustrates modified means for adjusting the timing of said ignition devices.

These means are supposed to be attached to the pump means 66 shown in Fig. 9, in which said pump means are attached to the inlet manifold by means of a vacuum line 65.

The essential feature of the present invention resides primarily in the proposal to increase the compression in an explosion type of engine by providing communicating main and auxiliary chambers, each of which are provided with ignition means, said auxiliary chamber being relatively less in volume than the main combustion chamber, the operation of the engine being such as to control the actuation of said ignition means whereby to ignite the charge in the auxiliary chamber prior to the ignition of the charge in the main chamber. Preferably, the timing of the ignition means actuation is controlled to vary the time interval between the actuations, and further, it may be noticed that the means illustrated in the present drawings may so adjust the actuation of said ignition means in the main and auxiliary combustion chambers as to cause the same to be actuated either simultaneously or at different times.

Furthermore, my present invention provides efficient means for varying the normal compression pressure in the main combustion chamber of the engine in accordance with different load conditions, and it may be noticed that the control of the compression pressure may be had automatically if so desired. The present construction is adapted for incorporation in engines of the compression ignition type as well as in engines of the spark ignition type, but in all cases the arrangement is such as to prevent ignition of the charge in the main combustion chamber by maintaining the compression therein less than that at which ignition might occur. For low speed or low load engine operating conditions it will be observed that the combustible mixture in the main combustion chamber may be rather lean and not readily ignited by the usual means, but by incorporating therewith an auxiliary combustion chamber in which a combustible fluid of the proper mixture of air and fuel is contained, it is possible to ignite the charge in the auxiliary combustion chamber in advance of the usual igniting of the charge at the main combustion chamber, the increased pressures resulting from the burning of the charge in said auxiliary chamber being communicated with the main combustion chamber for relatively increasing the pressure therein to such a degree as to make it possible to readily ignite the comparatively lean charge of fluid in the main combustion chamber.

In those engines in which the main combustion chamber is charged with air which is to be compressed to ignite fuel which is injected therein, and in which the normal means for compressing the air is insufficient to raise the pressure an amount sufficient to spontaneously ignite the fuel which is injected therein, it will be readily seen that the construction as embodied in my present invention will automatically increase the pressure of the air the proper amount for effecting an efficient igniting and burning of the charge in said main combustion chamber.

The present principles of my invention can also be incorporated advantageously in those engines in which the fuel mixture in the main combustion chamber is of a proper mixture for supporting combustion, the increase in pressure being such as to facilitate this combustion and to provide for an improved engine performance.

Referring more particularly to Figs. 1 and 2 it will be observed that the engine illustrated includes a cylinder 1 in which a piston 2 is operable, said piston being connected to the crankshaft (not shown) of the engine by means of the connecting rod 4 which is connected with the piston by means of the wrist pin 3. A cylinder head 1A is secured to the cylinder and arranged to close the outer open end of said cylinder. The engine is provided with the usual exhaust valve 5 and the inlet valve 5a, these valves being preferably carried by the cylinder structure and arranged to open into the main combustion chamber hereinafter described in more detail. The spark plug 6 is preferably located relatively closer to the center of the exhaust valve than to the center of the inlet valve.

The engine illustrated in Figs. 1 and 2 is preferably such as to provide the main and auxiliary combustion chambers within the cylinder head. The auxiliary combustion chamber 9 is connected by a narrow Venturi passage 8 which opens through the bottom wall of the combustion chamber for placing the auxiliary chamber 9 in communication with the main combustion chamber 13a and 13b by means of the intermediate chamber 13. Preferably this auxiliary combustion chamber is formed by a plug 10 which is supported by the cylinder head and secured thereto by means of a nut 11, suitable washers or gaskets being employed to seal the joints between the plug 10 and cylinder head structure. This plug 10 is provided with a hollow extension for providing the chamber 9 and is preferably provided with fins 9b extending into the cylinder head jacket for the purpose of cooling said auxiliary combustion chamber. Suitable gaskets 9a are employed for sealing the joint between the lower end of the extension of plug 10 and the cylinder head, a spark plug 7 or other suitable ignition device being carried by the head and having spark terminals within the chamber 9. The plug 10 preferably carries a separate plug 12 which may be removed therefrom to permit access to be had to the interior of the auxiliary chamber 9 whereby to permit the cleaning of the Venturi passage 8 without removing the entire assembly.

The cylinder head cooperates with the piston when in its outermost position of travel to provide the chamber 13 which lies intermediate the auxiliary chamber 9 and main combustion chamber 13a, 13b. Preferably the under face of said cylinder head is ribbed or otherwise formed with serrations 14a and with fins 14 extending within the cylinder head jacket. These fins serve to cool the chamber 13 and may be of any suitable height while the ribs 14a form a wave-like roof to the chamber 13 and are shallow, these ribs 14a serving to retard the flame travel through chamber 13 and to facilitate cooling of the charge without interfering with the transmission of pressure from the auxiliary chamber to the main chamber. In a four stroke cycle engine of the character illustrated in Figs. 1 and 2, the operation is as follows. The inlet valve 5a opens at the usual time at the beginning of the suction stroke and the fuel mixture charge is introduced into the cylinder via the main combustion chamber 13b and 13a, said cylinder space being designated by the reference character 13c. Subsequent to the suction stroke, the piston begins to travel outwardly of the cylinder to compress the fuel mixture charge therein and when the piston reaches the level as indicated by the dotted line 8a, the inlet valve 5a closes, the compression then commencing. Some of the fuel mixture charge is forced into the auxiliary chamber 9 and the remaining into the main combustion chamber 13a, 13b, the said auxiliary combustion chamber having a volume which may vary from 2% to 12% of the total volume of the compression space. When the piston reaches the height as indicated by the dotted line 8b the spark plug 7 is fired and ignites the mixture in the auxiliary chamber 9, said Venturi passage 8 serving to create sufficient turbulence in the auxiliary chamber 9 to prevent any stratification of the charge therein, and the burning gases in said chamber 9 are maintained relatively cool because of the additional cooling fins incorporated therewith. The pressure developed by burning of the charge in chamber 9 is communicated with the main combustion chamber by means of the intermediate chamber 13 and when the piston approaches its outermost position of travel, the spark plug 6 is then fired. It will be understood that the heat of the burned gases escaping from the space 13 between the cylinder head and piston is not sufficient to ignite the main charge, and the interval between the actuation of the ignition means 7 and 6 is so small as to not allow sufficient time for the flame to ignite the major portion of the charge in said main combustion chamber. Preferably the spark plug 6 is placed within a pocket 6a so that the burned gases escaping from chamber 13 will not foul the fresh charge in the neighborhood of the spark plug 6. After the firing of the charge in the main combustion chamber the expansion stroke begins, the exhaust valve 5 opens at the usual time, preferably when the piston approximately reaches the line as indicated at 8a. Subsequent to the exhaust stroke, the cycle is repeated. It will be noticed that the chamber 9 remains filled with burned gases at about atmospheric pressure, but in view of the fact that the spark plug 7 is located low in the compression chamber 9, the same will be in a position to fire the charge readily since during the compression stroke these burned gases in said chamber 9 are forced into the upper part of the auxiliary combustion chamber. Preferably I find it desirable to ignite the small charge in the auxiliary chamber about 2° to 12° of engine crankshaft rotation in advance of the ignition of the main charge in said main combustion chamber. It will be obvious that the particular timing of the ignition in these chambers may be varied and the time interval between the ignition of the charge in said chambers may be decreased or increased depending upon the engine stroke and the engine load conditions. The spark plugs 6 and 7 are shown as being connected to the ignition distributors 15 and 21. The primary current is interrupted by the single cam 25 and the two contact breakers 17 and 23 respectively associated with plugs 6 and 7.

These breakers are so placed with respect to the cam 25 that the breaker 23 interrupts the primary current leading to distributor 21 before the actuation of the breaker 17 which interrupts the primary current leading to distributor 15. The breakers 17 and 23 are fastened to a rotatable plate 25a moved by an arm 27c (see connection with pump 66 in Fig. 9) so that if desired, the timing of these ignitions may be varied by the degrees of vacuum in the inlet manifold. The secondary wires of the ignition circuit is indicated by reference character 16, 18' designates the condenser and primary coil while 19 designates the contact or switch which closes and breaks the primary current. The parts 22, 23, 24 and 20 indicate respectively the same parts for the plug 7. The primary current is therefore controlled separately for both plugs so that one may be interrupted idependently of the other in any suitable manner. The above construction permits the timing of the actuation of these ignition devices at will, but in all cases it will be observed that the spark plug 7 is preferably actuated in advance of the spark plug 6.

Referring more particularly to Fig. 2, it will be seen that the communication between the chamber portion 13a and 13b is preferably restricted along the dotted line 13c whereby to minimize the intermingling of burned gases and fresh gases in the chamber portion 13b.

Figs. 3 and 4 illustrate a modified engine construction embodying an elongated main combustion chamber overlying the intake and exhaust valves and in communication with an auxiliary combustion chamber also carried by the cylinder head. The engine includes a cylinder 28, a cylinder head 28a, a piston 29, exhaust and intake valves 30 and 31 respectively controlling the exhaust and intake through the exhaust and intake passages 30a and 31a. The pipe 32 is connected with the conventional small jet of the carburetor 64 (see Fig. 9) and with the auxiliary combustion chamber. A plug 35 is supported by the cylinder head similarly as the plug 10 is shown in Figs. 1 and 2 and this plug 35 carries an insert or other suitable member 34 which in turn supports an automatic valve 34a arranged to admit a mixture of fuel and air into the small chamber 35' of the plug 35. Preferably the said plug 35 has incorporated therewith suitable gaskets for sealing the joint between said plug and cylinder head structure. The auxiliary combustion chamber 35' is connected with the inner chamber 36a by means of a venturi 35b, a spark plug 36 being supported in the chamber 36a. This chamber 36a is circular and substantially coaxial with the engine cylinder and it will be noted that for the most part, this annular combustion chamber is substantially cylindrical as shown at 37a, the same opening outwardly or upwardly into the chamber 35' of the plug, and inwardly or downwardly to the cylinder and main combustion chamber, said main combustion chamber comprising portions 39 and 40, the former overlying the cylinder while the latter overlies the cylinder block containing the intake and exhaust valves. The main combustion chamber 39, 40 is provided with an offset portion or pocket 41 preferably adjacent the extreme end of the said chamber and the spark plug 42 is arranged to lie within this pocket. Said main combustion chamber is thus arranged in restricted communication with the auxiliary chamber and it will be noted that the cylinder head is provided with a low ceiling portion overlying the piston when in its outermost position of travel to define an intermediate chamber similar in character to the intermediate chamber 13 shown in Figs. 1 and 2. Preferably the cylinder head carries a fuel injection apparatus 42a adapted to inject the fuel into the main combustion chamber, said apparatus preferably overlying or arranged co-axially with the exhaust valve. The cylinder head is provided with suitable water jacket portions 43 through which a cooling medium may be circulated for cooling the head and the auxiliary combustion chamber.

When the above construction is employed with an engine operating in a manner similar to the methods explained for Figs. 1 and 2, the automatic valve 34a is, of course, eliminated and the plug 34 serves only to decrease or increase the cubic content of the chamber 35', and in this connection, of course, the injection apparatus or injector 42a is inoperative or eliminated.

It will be understood that these constructions are capable of adaptation to three different methods of operation. The first method employs a construction in which pure air is admitted through the inlet valve during the engine suction period and a small volume of fuel mixture is admitted through the automatic valve 34a into the auxiliary combustion chamber. When the intake valve closes the piston is operable to compress the air in the main combustion chamber and into the auxiliary combustion chamber. The construction is preferably one which is so arranged as to permit only of a limited amount of compression by the piston, but by igniting the fuel mixture in the auxiliary combustion chamber prior to the combustion of the main charge in the main combustion chamber, it will be seen that the compression can be suddenly increased a material amount and pressures of 15 pounds above atmosphere can possibly be obtained. The operation of this engine is substantially the same as that shown in Figs. 1 and 2, the burning fuel being arranged to provide a flame travel which progresses from the auxiliary chamber into the main combustion chamber. In view of the fact that the initial compression of the gases in the main combustion chamber is not sufficient to support combustion, it will be readily seen that the supplemental pressure originating in the auxiliary combustion chamber will be sufficient to increase the average pressure within the main combustion chamber so that the compressed air is sufficient to ignite the fuel when injected through an injector 42a or provide sufficient pressure to the gases to permit the same to be readily ignited by the spark plug or other suitable ignition means 42.

The second method is very similar to the above first method with the difference that a fuel mixture is admitted into the main combustion chamber through the inlet valve instead of pure air as described in connection with the first method. The third method eliminates the automatic valve 34a and the construction is somewhat similar to that described in Figs. 1 and 2. This ignition system is one which will raise the compression suddenly during the last stages of compression preparatory to the igniting of said fuel mixture at the beginning of the power stroke.

In Fig. 3 the spark plug 42 is shown adjacent the injector 42a and it is possible to time the firing of the spark plugs 36 and 40 so that the former will fire head of the latter. The elongated combustion chamber 39, 40 is such as to minimize the intermingling of burned gases with the fresh charge in said combustion chamber, and if desired, the annular portion 37a of the auxiliary combustion chamber may be eliminated and yet obtain satisfactory results.

In connection with Figs. 3 and 4, it will be noted that Figs. 5 and 6 illustrate a valve actuating mechanism for the valves 30 and 31. These valves are preferably located substantially in a common plane extending at right angles to the plane containing the crankshaft and cylinder axes, the rocker arms or levers being so arranged as to transmit the lift from the cams 49a and 51a carried by the camshaft 46. These arms are preferably designated by reference characters 48 and 50, are pivotally mounted on shafts 47 and 45 respectively and carry on their free ends the rollers 51 for engagement with these cams, the roller 51 carried by arm 50 engages the cam 51a while the roller 49 carried by arm 48 engages the cam 49a.

Figs. 7 and 8 illustrate a still further modified construction and incorporate a principle of my invention with an overhead valve engine that is one in which the valves are carried by the cylinder head and open downwardly into the combustion chamber. In this construction the cylinder head is provided with a main combustion chamber 58 and an auxiliary chamber 55 surrounding the main combustion chamber, said auxiliary chamber comprising a relatively thick annular ring which is in open communication with said main combustion chamber. A piston 54 is operable within the engine cylinder and at least at one point the annular combustion chamber communicates directly with the main combustion chamber shown in Fig. 8, 55a illustrating an unrestricted opening while the dotted lines 55b illustrate how this communication may be had by means of a restricted opening.

It is appreciated that the wall surface of these combustion chambers is in excess of the wall surfaces of ordinary combustion chamber, but the gain in thermal efficiency by increasing the compression, especially under low load operation and when the charge in the auxiliary chamber is only a small part of the full charge, it will be seen that these advantages compensate for the disadvantage of a material amount of wall surface. The additional cost in equipping an engine of this type with dual ignition means is readily compensated for by the economies had in fuel consumption. Further, the compression of the charges in the Diesel type is had with relatively less work and the parts may be constructed appreciably lighter in weight, these advantages being particularly noticeable in connection with the bigger type of Diesel engines anywhere from 30 horsepower per cylinder and up. In the small type of engines, an engine constructed in accordance with my invention has a greater torque at low speeds and may also have greater efficiency.

In Fig. 9 it will be noted that the engine is equipped with a carburetor 64, the conduit or pipe 32 connecting the carburetor with the intake of the auxiliary chambers through an automatic valve 34a. (See Fig. 3.) A pipe 65 connects with a vacuum chamber 66 in which a piston is operable, said piston being connected by means of the connecting rod 66a and a spring to resist the vacuum in the manifold which tends to drive the piston toward the other side of the chamber. The pipe 65 connects preferably with the inlet manifold exactly above the venturi and the throttle therein, as shown, where the vacuum is greater than further away from the throttle. The throttle when nearly closed impedes the flow of the air past it and immediately behind this throttle the vacuum is greatest.

In case the throttle is wide open, the difference in vacuum in the manifold from the throttle to the cylinders is approximately the same, when the load on the engine is great, but not when the engine is rotating fast with said throttle opening. Said rod 66a is adapted to be connected with an arm 27c attached to an arm 67 attached to a plate 68 carrying a breaker apparatus as is well known in the art. Rotation of the plate 68 causes an advance in the timing of the ignition when the vacuum in the manifold is high and the charge to the cylinders is small. When the charge is great, or when the load on the engine is great, the spring 66a serves to provide an additional retarding means for the ignition.

It may be here noted that the ignition may be adjusted as to timing by means of the construction described in connection with Figs. 1 and 2 or by means of the construction shown in Fig. 1A where the ignition in said main and auxiliary combustion chambers are actuated simultaneously or may be actuated at different times. In this construction the arm of the interrupter plate 26 has a length smaller than that of the arm 27b belonging to the other interrupter plate. The arm 27c may be connected with the vacuum cylinder of Fig. 9 in a manner similar to the connection of arm 67 to the said vacuum cylinder. The ignition may be set in its normally advanced position so that the ignition of plug 6 in Figs. 1 and 2 is in advance of that of plug 7. It will be obviously seen that various timing relations may be readily obtained even to the extent that when the vacuum is a maximum or a minimum in the cylinder the ignition means may be fired substantially simultaneously.

Fig. 10 illustrates a two stroke cycle engine and in this construction it will be noted that the cylinder head carries a single valve 71 which opens inwardly of the engine cylinder, this valve supporting an injector 70. The engine comprises a cylinder 73 in which a piston 74 is operable, said piston having a projection 74a in the center thereof, provided with an overhanging head portion 74c, this overhanging portion providing an intermediate chamber lying between the main combustion chamber 74b and the annular auxiliary combustion chamber 75 lying within the cylinder block and extending around the cylinder. The ignition in chamber 75 is caused by the one or more spark plugs 75a and the chamber 75 is communicating with the chamber 74b by means of the outlet opening 75b which is substantially a venturi.

In Fig. 11 it will be noted that I have illustrated another engine construction of and which comprises a cylinder 80, a cylinder head 77, a fuel injector 76 and a piston 79, said piston having a baffle 78 carried thereby and provided with an overhanging rim or lip 78a, said overhanging portion facing the annular auxiliary combustion chamber 83. This chamber 83 is placed as high in the cylinder as possible and provided with an outlet 84 communicating with the chamber 81 lying intermediate the main combustion chamber 82 and auixliary combustion chamber 83. The overhanging portion of the piston projection is such as to minimize the intermingling of the burned gases with the fresh gases in the main combustion chamber by reason of the fact that such a construction tends to interfere with the free communication between said main and auxiliary chambers. The roof of the main combustion chamber is designated at 77a whereas the roof of the intermediate chamber 81 is designated as 77b, the piston face providing a face which cooperates with the face 77b and which may be designated by the reference character 78b.

In Fig. 12 I have illustrated a construction in which the injector is located in a single exhaust valve 85, said exhaust valve being also the inlet valve for the intake of pure air into the engine cylinder. The cylinder head 87 is secured to the cylinder 89 and closes the outer open end thereof, the piston 88 being operable within the said cylinder. The main combustion chamber lies within the cylinder and is designated 90 whereas the annular auxiliary combustion chamber 92 is arranged to surround the main combustion chamber and can be located within the cylinder block around said cylinder bore. The combustion chamber 92 is connected with the main combustion chamber by means of small openings or passages 91a and 96 being respectively located within spaced substantially parallel planes which extend substantially at right angles to the cylinder axis. One or more spark plugs 93 are carried in the auxiliary chamber, and preferably this chamber is connected with a source of fuel mixture supply by means of conduit 91 and the one or more valves 93 which are yieldingly held on their seat by means of a spring acting on said valves. In the main combustion chamber 90 it will be noted that the ignition in chamber 90 will take place generally after the piston has covered up the holes or openings 91a so that said burning gases have to then enter the chamber 90 through the passages 96.

In Fig. 13 it will be noticed that I have illustrated an engine of the opposed piston type. 97 and 97a are the left cylinder and piston, while 98 and 98a are the right cylinder and piston. 99 designates the combustion chamber which lies intermediate the top faces of the pistons. The engine is provided with the combustion chambers 100 which surround the engine cylinder and substantially encircle the combustion chamber 99. This chamber 100 communicates with the combustion chamber 99 by means of restricted openings 102 and 103, the fuel mixture being introduced into said chamber 100 by means of one or more automatic valves 100a. Pistons 98 and 98a are operable within the cylinder and are so arranged as to close the inner restricted openings 104 as shown in Fig. 13. A fuel injector 105 is preferably incorporated with an engine of this character and the spark plugs 101 are preferably arranged at the very end of said chambers 100.

The advantages of the present construction and methods as herein explained do not lie solely in the better thermal efficiency of the engine, but also are of advantage when there is a lesser amount of resistance on account of a smaller degree of compression during the starting period, these advantages being especially noted for an engine of the fuel injection type.

It will be apparent to those skilled in the art to which my invention pertains, that various modifications and changes may be made therein without departing from the spirit of my invention or from the scope of the appended claims.

It is emphatically understood that the explosive mixture burned in the auxiliary chambers of the various types of engines before the ignition of the main charge in the main combustion chambers thereof, raises the final mechanical compression and temperature attained by the total charge at the moment the piston reaches about top dead center position on the compression stroke, in two different ways in the high-compression type. Both ways are thermodynamical, or have a thermodynamical character in the way of creating a higher than mechanical compression. In the first way the air charge is so great, or the ratio of compression is so great that without the added pressure of said explosive charge, that Diesel fuel injected would not burn very well, because the final temperature would not be sufficient to burn it at all or cleanly without smoke.

In the second way the air charge or ratio of compression is so great that without the added pressure of said explosive charge in said auxiliary chambers, the Diesel fuel injected will burn very well and will burn efficiently and cleanly.

In both cases, of course, the same purpose is attained. The thermal efficiency is raised in both cases, and the loss of work by compressing the charge mechanically is diminished by adding thereto the compression work of an additional explosion of mixture.

It is therefore understood that the scope of the attached claims naturally include both possibilities for the high-compression type.

For the low-compression type only the thermal efficiency is raised and the work of mechanical compression is slightly decreased, but the compression ratio is always so great that the main charge in the main combustion chamber is always ignitable by sparkignition means, even if the compression ratio was 1 to 1.

Therefore because in the high compression type of engine the Otto cycle and the compression-ignition cycle are combined in the same engine, the high compression type is in the present method a type by itself besides the Otto-type.

It is understood that the main inlet valve and the auxiliary inlet valve 34a (see Figs. 3 and 4 may be equally applied in any of the arrangements of the other Figures 1, 2, 7, 8, 10 and 11 where such an auxiliary valve is not shown. (It is shown in Figs. 3, 4, 12 and 13.)

In the high compression type, these two valves are imperative, and may be equally applied on the explosive type in which two separate charges, one in the auxiliary chamber, and one in the main combustion chamber are introduced and ignited after each other. However, in the low compression type, this auxiliary valve 34a and auxiliary manifold 32 may be omitted, because the two charges may be introduced through the main inlet valve as shown and explained for Figs. 1 and 2.

Where for instance in the drawings in Figs. 10 and 11 the injector for the high-compression cycle has been shown, but no auxiliary valve 34a, it stands to reason that the auxiliary valve did not appear in the plane of the particular section of the figure of that type, but was supposed to be there anyway, of course, connected with the chamber 75 in Fig. 10 and with the chamber 83 in Fig. 11.

What I claim as my invention is:

1. In an internal combustion engine, having a cylinder, a cylinderhead closing the outer open end of said cylinder and provided with a main combustion chamber communicating with said cylinder, inlet and exhaust port means associated with the combustion chamber, an auxiliary combustion chamber restrictedly communicating with said main combustion chamber, and ignition means in each of said combustion chambers, said auxiliary chamber having fuel mixture intake means separate from the intake means of said main combustion chamber, the ignition in said auxiliary chamber taking place substantially ahead of that in said main chamber.

2. In an internal combustion engine having a cylinder, a cylinderhead closing the outer open end of said cylinder and provided with a main combustion chamber communicating with said cylinder, inlet and exhaust port means associated with the combustion chamber, an auxiliary combustion chamber restrictedly communicating with said main combustion chamber, and ignition means in each of said combustion chambers, said restricted communicating passage connecting said chambers including a venturi, the ignition in said auxiliary chamber taking place substantially ahead of that in the main chamber.

3. In an internal combustion engine, having a cylinder, a cylinderhead closing the outer open end of said cylinder and provided with a main combustion chamber communicating restrictedly with the said cylinder, inlet and exhaust port means associated with the main combustion chamber, an auxiliary combustion chamber restrictedly communicating with said main combustion chamber, and ignition means in each of said combustion chambers, the ignition in said auxiliary chamber taking place substantially ahead of that in the main chamber.

4. The combination of claim 3 in a compression ignition engine, a fuel injector in said auxiliary chamber and a fuel injector in said main chamber.

5. The combination of claim 3 in a compression-ignition engine, a fuel mixture manifold connected with the auxiliary chambers of said cylinders, spark ignition means in said auxiliary chambers to ignite said mixture therein substantially ahead of the fuel-injection in said main chamber.

JEAN A. H. BARKEIJ.

Disclaimer 2,173,081.—*Jean A. H. Barkeij*, Altadena, Calif. INTERNAL COMBUSTION ENGINE. Patent dated Sept. 12, 1939. Disclaimer filed Jan. 26, 1948, by the inventor.

Hereby limits the firing interval of the spark ignition types in this patent to a firing interval between 2° and 12° or 15° crankshaft rotation, called—substantially simultaneous firing—in the description lines 68, column 2, page 6, to line 14, column 1, page 7 ending with the words, —may be fired substantially simultaneously—, that is an interval of 2° to 12° or 15° crankshaft rotation, in the claims of this patent. That means he does not limit the interval for other types described.

Hereby limits the scope of all the claims herein as far as the spark-ignition type is concerned, _____ and the location of the second spark-ignition-means is concerned, firing substantially later or in general with an interval, to a position in an auxiliary chamber as clearly shown by numeral 6a in Fig. 1 and 41 in Fig. 3, and without limiting the location of the fuel-injection means for the combined spark-ignition-fuel-injection types, or the double-fuel-injection types.

The expression—substantially ahead—in the claims is limited to between 2° and 12° or 15° crankshaft rotation for spark ignition types and this interval may be also called—substantially simultaneously—if preferred, without referring this expression to page 1, column 1, hereof in relation to the engines of Saives and Werner, but referring to lines 9 to 15 on page 7, column 1 using the same expression, which refers to the present engines.

*(Official Gazette April 20, 1948.)*